United States Patent
Sameer (10) Patent No.: US 11,182,942 B2
(45) Date of Patent: *Nov. 23, 2021

(54) MAP GENERATION SYSTEM AND METHOD FOR GENERATING AN ACCURATE BUILDING SHADOW

(71) Applicant: HERE GLOBAL B.V., Eindhoven (NL)

(72) Inventor: Priyank Sameer, East Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,243

(22) Filed: Jul. 29, 2020

(65) Prior Publication Data
US 2020/0357156 A1 Nov. 12, 2020

Related U.S. Application Data

(63) Continuation of application No. 16/448,753, filed on Jun. 21, 2019, now Pat. No. 10,762,681.

(30) Foreign Application Priority Data

Jun. 26, 2018 (IN) .............................. 201811023775

(51) Int. Cl.
*G06T 11/60* (2006.01)
*G06T 3/00* (2006.01)
*G06T 3/20* (2006.01)

(52) U.S. Cl.
CPC ............ *G06T 11/60* (2013.01); *G06T 3/0068* (2013.01); *G06T 3/20* (2013.01)

(58) Field of Classification Search
CPC ......... G06T 11/60; G06T 3/0068; G06T 3/20; G06T 11/001
See application file for complete search history.

(56) References Cited

U.S. PATENT DOCUMENTS 7,889,913 B2  2/2011 Wells
8,643,678 B1 * 2/2014 Jacobs ................... G06T 15/60
                                                      345/648

(Continued)

FOREIGN PATENT DOCUMENTS

| CN | 101894382 A | 11/2010 |
| DE | 102018203242 A1 | 9/2019 |
| JP | 2007129277 A | 5/2007 |
| JP | 2009 070097 A | 4/2009 |
| KR | 20000050372 A | 8/2000 |

OTHER PUBLICATIONS

Ibarra-Arenado, M. et al., *Shadow-based Vehicle Detection in Urban Traffic*, Sensors 17, 975 (2017) 1-19.

(Continued)

*Primary Examiner* — Maurice L. McDowell, Jr.
(74) *Attorney, Agent, or Firm* — Alston & Bird LLP (57) ABSTRACT

A map generation system, method and computer program product are provided to generate a shadow layer from a raster image that accurately represents the shadows of one or more buildings. In the context of a map generation system, the map generation system extracts pixel values from a raster image of one or more buildings and processes the pixel values so as to retain pixel values within a predefined range while eliminating other pixel values. The pixel values that are retained represent a shadow. The map generation system also modifies the a representation of the shadow by modifying the pixel values of respective pixels so as to have a shape corresponding to the shape of the one or more buildings. The map generation system causes presentation or storage of the building layer representing the one or more buildings and a shadow layer representing the shadow.

20 Claims, 6 Drawing Sheets

(56) References Cited

U.S. PATENT DOCUMENTS

| | | | |
|---|---|---|---|
| 10,762,681 B2* | 9/2020 | Sameer | G06T 11/60 |
| 2002/0123841 A1* | 9/2002 | Satoh | G01C 21/3638 |
| | | | 701/532 |
| 2004/0263514 A1* | 12/2004 | Jin | G06K 9/0063 |
| | | | 345/440 |
| 2007/0115284 A1* | 5/2007 | Kim | G06T 7/70 |
| | | | 345/426 |
| 2008/0118149 A1 | 5/2008 | Fu et al. | |
| 2009/0094557 A1* | 4/2009 | Howard | G06T 17/05 |
| | | | 715/848 |
| 2010/0177095 A1 | 7/2010 | Watkins et al. | |
| 2011/0216962 A1 | 9/2011 | Kim et al. | |
| 2013/0222432 A1* | 8/2013 | Arrasvuori | H04M 1/0268 |
| | | | 345/660 |
| 2014/0204205 A1 | 7/2014 | Kotz et al. | |
| 2014/0376769 A1 | 12/2014 | Bulan et al. | |
| 2015/0003741 A1* | 1/2015 | Zhang | G06T 7/33 |
| | | | 382/199 |
| 2015/0187128 A1* | 7/2015 | Jones | G06T 15/60 |
| | | | 345/426 |
| 2015/0317536 A1 | 11/2015 | Kuehnle | |
| 2016/0314357 A1 | 10/2016 | Fey et al. | |
| 2019/0282097 A1 | 9/2019 | Novotny et al. | |
| 2019/0339706 A1 | 11/2019 | Batur | |
| 2020/0151912 A1 | 5/2020 | Torikura et al. | |

OTHER PUBLICATIONS

Irvin, R. B. et al., *Methods for Exploiting the Relationship Between Buildings and Their Shadows in Aerial Imagery*, Carnegie Mellon University (Dec. 25, 1988) 19 pages.

Notice of Allowance for U.S. Appl. No. 16/448,753 dated Apr. 30, 2020.

Proceedings: Image Understanding Workshop (Apr. 1979), 184 pages.

Song, H. et al., *Shadow Detection and Reconstruction in High-Resolution Satellite Images via Morphological Filtering and Example-Based Learning*, IEEE Transactions on Geoscience and remote sensing (2013) 10 pages.

Wang, Q. et al., *An Automatic Shadow Detection Method for VHR Remote sensing Orthoimagery*, Remote Sens. 9 (2017) 25 pages.

Zhang, X. et al., *Image-Based Building Shadow Shadow Silhouette Technique*, Paper, Special Edi Retrieval and Editing, vol. 55, No. 3 (2001) 405-411.

Zhao, T. et al., *Car Detection in Low Resolution Aerial Image*, IEEE (2001) 8 pages.

U.S. Appl. No. 16/448,753, filed June 21, 2019, 2020/0035004 A1, Allowed.

Non-Final Office Action for U.S. Appl. No. 16/920,001 dated May 11, 2021.

Notice of Allowance for U.S. Appl. No. 16/920,001 dated Jun. 30, 2021.

\* cited by examiner

MAP GENERATION SYSTEM AND METHOD FOR GENERATING AN ACCURATE BUILDING SHADOW

CROSS-REFERENCE TO RELATED APPLICATIONS

This application is a continuation of U.S. patent application Ser. No. 16/448,753, filed Jun. 21, 2019, which claims priority to Indian Application No. 201811023775, filed Jun. 26, 2018, the entire contents of which are incorporated herein by reference.

TECHNOLOGICAL FIELD

An example embodiment relates generally to the generation of a map including one or more buildings and, more particularly, to a map generation system, method and computer program product for generating accurate building shadows from a raster image.

BACKGROUND

One common example of a map used for navigation or other purposes provides a birds eye view of a plurality of buildings, roadways and other features. In such maps, the buildings are generally represented by two-dimensional (2D) footprints, at least some of which have a size and shape that is proportional to the size and shape of the respective buildings. In an effort to generate maps having depth and, therefore, and at least a three-dimensional (3D) feel, some maps of this type include shadows of the various objects including the buildings.

In order to generate maps having shadows, relatively high resolution imagery, such as imagery obtained from light detection and ranging (LIDAR) techniques, is utilized. While high resolution imagery provides data from which a map having 2D footprints of various objects including buildings and associated shadows can be generated, the capture of the high resolution imagery requires relatively sophisticated equipment and the processing of the high resolution imagery to extract the data representative of the buildings and the shadows may be computationally intensive, thereby consuming substantial processing resources.

Lower resolution imagery, such as raster imagery, is available and data representative of the buildings and the shadows may be extracted from the raster imagery without requiring utilization of as many processing resources. However, the data representative of the shadows obtained from the raster imagery includes a substantial amount of noise and speckle which results in the generation of shadows that are inaccurate or otherwise distracting. Even after the additional processing of the data representative of the shadows, such as by utilizing a convolutional neural network (CNN), deep learning techniques and/or artificial intelligence techniques, the resulting shadows in the map that is generated remain noisy and speckled and are generally of lower quality than is desired.

BRIEF SUMMARY

A map generation system, method and computer program product are provided in accordance with an example embodiment in order to generate a shadow layer from a raster image that more accurately represents the shadows of one or more buildings. By generating the shadow layer from a raster image, the map generation system, method and computer program product conserve the processing resources required to generate the shadow layer and are therefore more computationally efficient than techniques that rely upon high resolution imagery. However, the map generation system, method and computer program product of an example embodiment generate the shadow layer from the raster image in a manner that improves the accuracy of the resulting building shadows relative to other techniques that utilize a raster image, thereby generating a higher quality map and improved user experience in conjunction with the use of the resulting map.

In an example embodiment, a map generation system is provided that includes processing circuitry and at least one memory including the computer program code with the at least one memory and the computer program code configured to, with the processing circuitry, cause the map generation system to extract pixel values from a raster image of one or more buildings. The at least one memory and the computer program code are also configured to, with the processing circuitry, cause the map generation system to process the pixel values so as to retain pixel values within a predefined range while eliminating other pixel values. The pixel values that are retained as a result of being within the predefined range represent a shadow. The at least one memory and in the computer program code are further configured to, with the processing circuitry, cause the map generation system to modify a representation of the shadow by modifying the pixel values of respective pixels based upon a shape of the one or more buildings as defined by a building layer such that the representation of the shadow, as modified, has a shape corresponding to the shape of the one or more buildings. The at least one memory and the computer program code are additionally configured to, with the processing circuitry, cause the map generation system to cause presentation or storage of the building layer representing the one or more buildings and a shadow layer representing the shadow having the shape corresponding to the shape of the one or more buildings.

The at least one memory and the computer program code are configured to, with the processing circuitry, cause the map generation system of an example embodiment to modify the representation of the shadow by translating a representation of the one or more buildings toward an edge of the representation of the shadow and modifying the pixel values of respective pixels of the representation of the shadow to more closely align the edge of the representation of the shadow with a translated representation of the one or more buildings. The at least one memory and the computer program code are configured to, with the processing circuitry, cause the map generation system of this example embodiment to translate the representation of the one or more buildings by translating the representation of one or more buildings based upon a height of the one or more buildings, such as an average height of a respective building.

The at least one memory and the computer program code are configured to, with the processing circuitry, cause the map generation system of an example embodiment to modify the representation of the shadow by eliminating one or more portions of the representation of the shadow that represent one or more objects other than the one or more buildings. The at least one memory and the computer program code are configured to, with the processing circuitry, cause the map generation system of an example embodiment to modify the representation of the shadow by modifying the pixel values of respective pixels based upon the shape of the one or more buildings such that the representation of the shadow, as modified, has an identical shape to the shape of the one or more buildings. The at least one memory in the computer program code are further configured to, with the processing circuitry, cause the map generation system of an example embodiment to modify the representation of the shadow by accessing the building layer that defines the two-dimensional footprint representing the shape of each of the one or more buildings.

In another example embodiment, a method is provided that includes extracting pixel values from a raster image of one or more buildings and processing the pixel values so as to retain pixel values within a predefined range while eliminating other pixel values. The pixel values that are retained as a result of being within the predefined range represent a shadow. The method of this example embodiment also modifies a representation of the shadow by modifying the pixel values of respective pixels based upon a shape of the one or more buildings as defined by a building layer. As such, the representation of the shadow, as modified, has a shape corresponding to the shape of the one or more buildings. The method of this example embodiment further includes causing presentation or storage of the building layer representing the one or more buildings and a shadow layer representing the shadow having the shape corresponding to the shape of the one or more buildings.

The method of an example embodiment modifies the representation of the shadow by translating a representation of the one or more buildings toward an edge of the representation of the shadow and modifying the pixel values of respective pixels of the representation of the shadow to more closely align the edge of representation of the shadow with the translated representation of the one or more buildings. The method of this example embodiment may translate the representation of one or more buildings by translating the representation of the one or more buildings based upon a height of the one or more buildings, such as an average height of a respective building.

The method of an example embodiment modifies the representation of the shadow by eliminating one or more portions of the representation of the shadow that represent one or more objects other than the one or more buildings. The method of an example embodiment modifies the representation of the shadow by modifying the pixel values of respective pixels based upon a shape of the one or more buildings such that the representation of the shadow, as modified, has an identical shape to the shape of the one or more buildings. The method of an example embodiment also includes accessing the building layer that defines a two-dimensional footprint representing the shape of each of the one or more buildings.

In a further example embodiment, a computer program product is provided that includes at least one non-transitory computer-readable storage medium having computer-executable program code portions stored therein with the computer-executable program code portions including program code instructions configured to extract pixel values from a raster image of one or more buildings and program code instructions configured to process the pixel values so as to retain pixel values within a predefined range while eliminating other pixel values. The pixel values that are retained as a result of being within the predefined range represent a shadow. The computer-executable program code portions also include program code instructions configured to modify a representation of the shadow by modifying the pixel values of respective pixels based upon the shape of the one or more buildings as defined by a building layer. As such, the representation of the shadow, as modified, has a shape corresponding to the shape of the one or more buildings. The computer-executable program code portions further include program code instructions configured to cause presentation or storage of the building layer representing the one or more buildings in a shadow layer representing the shadow having the shape corresponding to the shape of the one or more buildings.

In an example embodiment, the program code instructions configured to modify the representation of the shadow include program code instructions configured to translate a representation of one or more buildings toward an edge of the representation of the shadow and program code instructions configured to modify the pixel values of respective pixels of the representation of the shadow to more closely align the edge of the representation of the shadow with the translated representation of the one or more buildings. The program code instructions configured to translate the representation of the one or more buildings may include program code instructions configured to translate the representation of the one or more buildings based upon a height of the one or more buildings, such as an average height of a respective building.

In an example embodiment, the program code instructions configured to modify the representation of the shadow include program code instructions configured to eliminate one or more portions of the representation of the shadow that represent one or more objects other than the one or more buildings. The program code instructions configured to modify the representation of the shadow in accordance with an example embodiment may include program code instructions configured to modify the pixel values of respective pixels based upon the shape of the one or more buildings such that the representation of the shadow, as modified, has an identical shape to the shape of the one or more buildings.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A map generation system, method and computer program product are provided in accordance with an example embodiment in order to generate a map in which the shadows cast by buildings are derived in an accurate manner from raster imagery. By deriving the shadows from raster imagery, the map generation system, method and computer program product may generate the map including the buildings and the shadows cast by the buildings in a computationally efficient manner. However, the map generation system, method and computer program product of an example embodiment create an accurate representations of the shadows with less noise and speckle from other objects, such as trees, shrubs, vehicles or the like. Thus, the resulting map may provide for an enhanced user experience as a result of the more accurate representation of the shadows cast by the buildings, but may be generated in a manner that conserves computational resources by relying upon lower resolution or average resolution imagery in the form of raster imagery.

Figure 1:
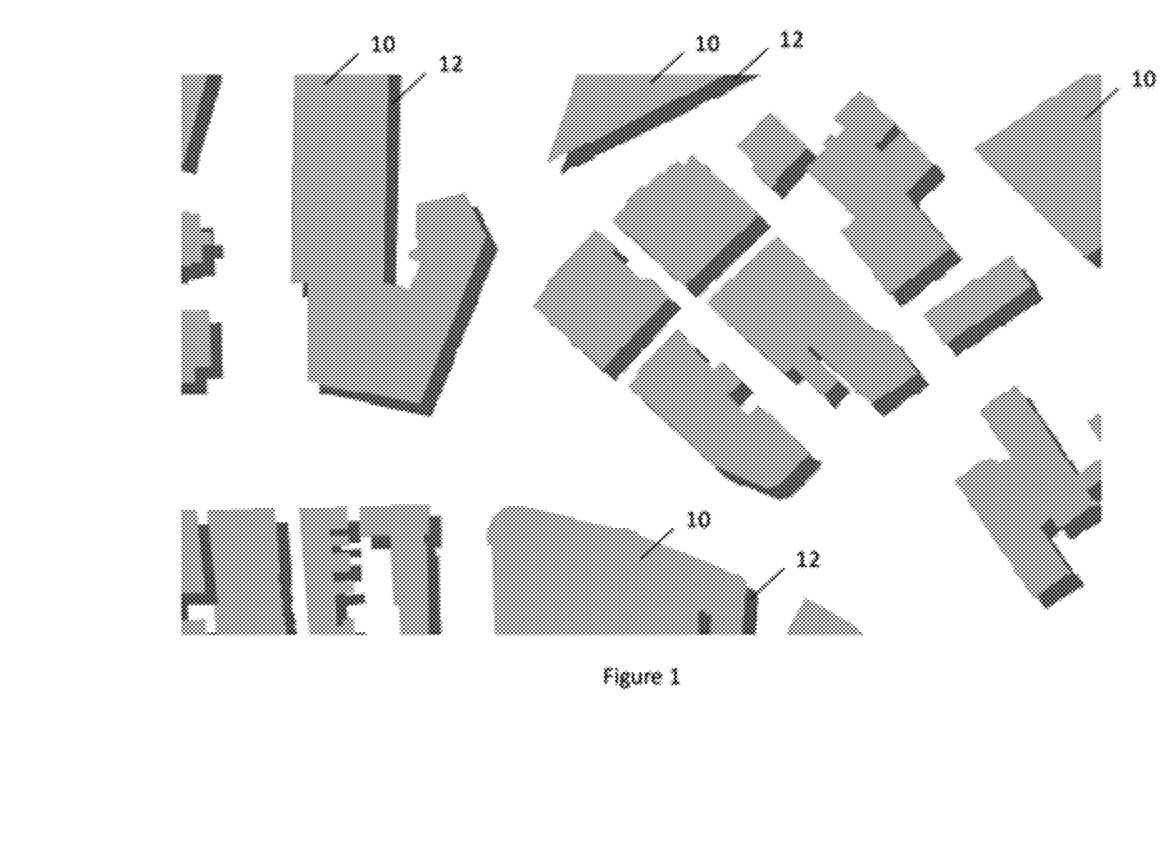
FIG. 1 is an example of a map generated in accordance with an example embodiment of the present disclosure that includes the two-dimensional footprints of a plurality of buildings and associated shadows for the respective buildings.

Referring now to FIG. 1, a portion of a map generated in accordance with an example embodiment is depicted. As shown, the map includes representations of one or more buildings 10. Although the buildings may be represented in various manner, the buildings of the map of FIG. 1 are represented as two dimensional (2D) footprints of the buildings. As described below, the representations of the buildings may be defined by a building layer that may be derived from raster imagery. In this regard, the pixels representative of one or more buildings may be identified from the raster imagery, such as based upon the pixel values extracted from the raster imagery being representative of a building, the shape of a group of pixels having comparable values being representative of a building or other building detection techniques. The resulting building layer defines the size, shape and location of each of the one or more buildings such that the buildings may then be presented in a map, such as shown in FIG. 1.

In accordance with an example embodiment, the map generation system, method and computer program product generate representations of the shadows cast by the one or more buildings from the raster imagery. As shown in FIG. 1, the shadows 12 create a three dimensional (3D) feel for the resulting map and generally enhance the user experience in conjunction with interacting with the map. As described below, the representation of the shadows may be generated from raster imagery in manner that is both computationally efficient and results in an accurate representation of the shadows cast by one or more buildings.

Figure 2:
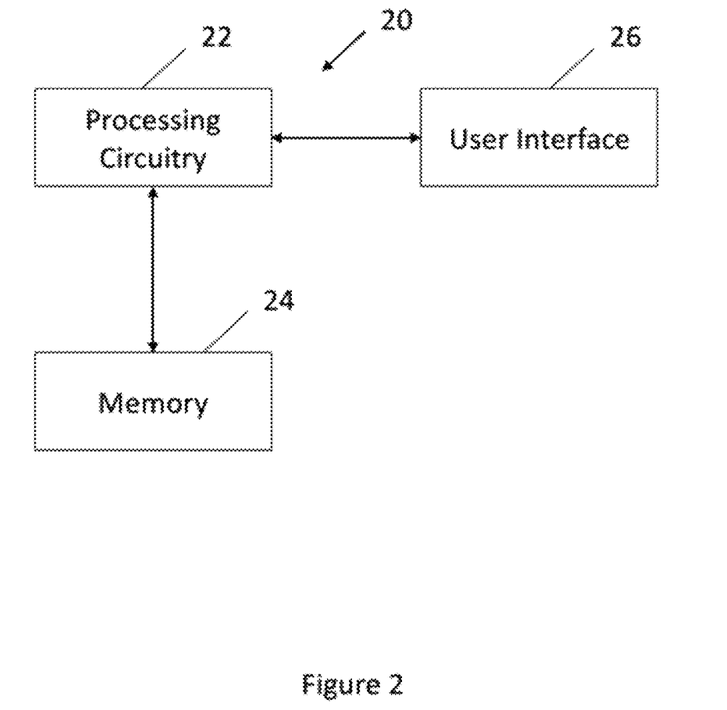
FIG. 2 is a block diagram of a map generation system in accordance with an example embodiment of the present disclosure.

The map generation system 20 of an example embodiment is depicted in FIG. 2. The map generation system may be embodied in a variety of computing devices, such as servers, computer workstations for the like. In this regard, the map generation system may be embodied by a navigation system or may otherwise be associated with, such as in communication with a navigation system that utilizes the resulting maps to provide navigational features, such as routes, estimated arrival times or the like, to a user. As shown in FIG. 2, the map generation system of an example embodiment includes processing circuitry 22, a memory device 24 and optionally a user interface 26.

In some embodiments of the processing circuitry 22, the processing circuitry may be in communication with the memory device 24 via a bus for passing information among components of the map generation system 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the navigation system to carry out various functions in accordance with an example embodiment. For example, the memory device could be configured to buffer input data for processing by the processing circuitry. Additionally or alternatively, the memory device could be configured to store instructions for execution by the processing circuitry.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, the computing device) configured to employ an embodiment by further configuration of the processor by instructions for performing the algorithms and/or operations described herein. The processing circuitry may include, among other things, a clock, an arithmetic logic unit (ALU) and logic gates configured to support operation of the processor.

The map generation system 20 may also optionally include a user interface 26 that may, in turn, be in communication with the processing circuitry 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry may be configured to control one or more functions of one or more user interface elements through computer program instructions (for example, software and/or firmware) stored on a memory accessible to the processing circuitry (for example, memory device 24, and/or the like).

Although not shown in FIG. 2, the map generation system 20 of an example embodiment may also include a communication interface, such as in instances in which the map generation system communicates with other devices, such as other computing devices via a network connection. The communication interface may be any means such as a device or circuitry embodied in either hardware or a combination of hardware and software that is configured to receive and/or transmit data from/to other electronic devices in communication with the navigation system. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s).

Figure 3:
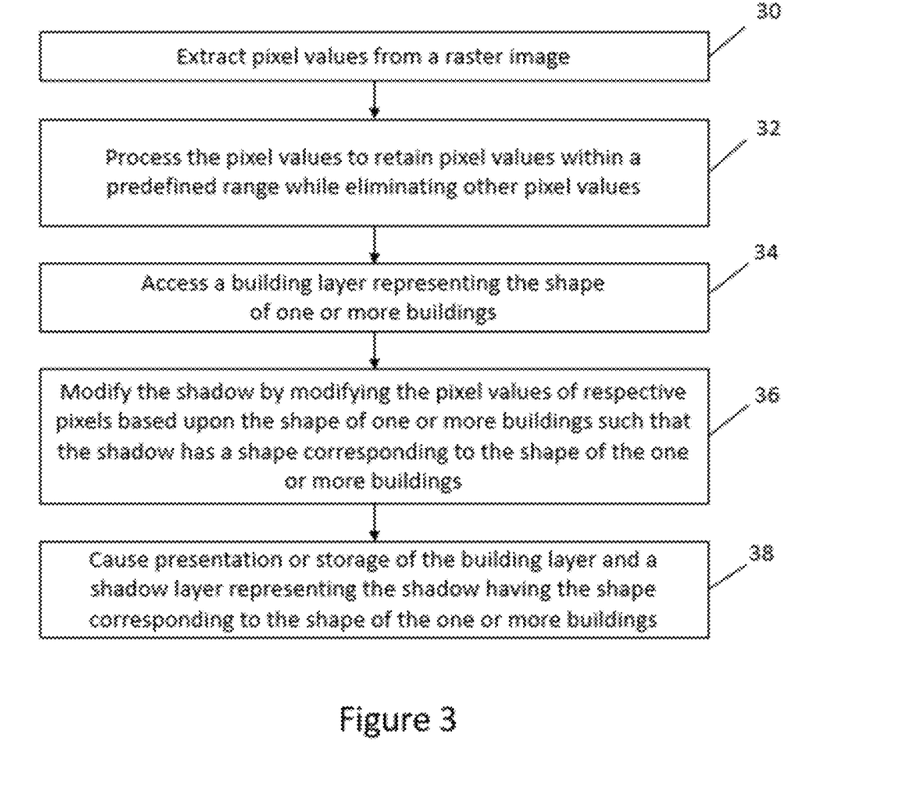
FIG. 3 is a flow chart illustrating operations performed, such as by the map generation system of FIG. 2, in accordance with an example embodiment of the present disclosure.

Referring now to FIG. 3, the operations performed, such as by the map generation system 20 of FIG. 2, in order to generate a map having accurate building shadows from raster imagery in accordance with an example embodiment are illustrated. As shown in block 30 of FIG. 3, the map generation system includes means, such as the processing circuitry 22 or the like, configured to extract pixel values from a raster image of one or more buildings, such as by raster pixel value detection. The raster image may have been previously captured and may be stored, such as by the memory device 24 of the map generation system or by a database, cloud storage or other memory device, in communication with the map generation system. Alternatively, the map generation system may process the raster imagery in real time or near real time as the raster imagery is captured and provided to the map generation system in order to extract the pixel values.

Based upon the pixel values extracted from a raster image, the pixels representative of shadows are identified. As shown in block 32 of FIG. 3, the map generation system 20 includes means, such as the processing circuitry 22 or the like, for processing the pixel values that have been extracted from the raster image so as to retain pixel values within a predefined range while eliminating other pixel values. The pixel values that are retained as a result of being within the predefined range represent shadows, while those pixels having pixel value that are eliminated represent features other than shadows, such as buildings, terrain or other objects. In an example embodiment, pixel values that represent a black color or a color very nearly black are considered to be representative of shadows. Thus, the predefined range of one embodiment includes the pixel values representative of a black color in, one embodiment, the pixel values representative of a black color and colors that are nearly black. Thus, those pixels from a raster image having pixels value representative of a black color or colors that are nearly black are retained as representative of a shadow, while other pixels having pixel values representative of lighter color are eliminated, at least for purposes of the creation of an accurate representation of the shadows.

As shown in block 34 of FIG. 3, the map generation system 20 of an example embodiment also include means, such as the processing circuitry 22, the memory device 24 or the like, for accessing a building layer representative of the size, shape and location of one or more buildings. For example, the building layer may define 2D footprints representative of the size and shape of respective buildings with the 2D footprints positioned upon a map so as to be representative of the location of the respective buildings. The building layer may be stored by the memory device or may be stored by a database, cloud storage or other external memory device that is in communication with and may be accessed by the map generation system. The building layer may have been previously created, such as from the raster image or based upon other information. Alternatively, the building layer may be generated, such as from the raster image or from other information, at the time in which the building layer is accessed. Although the building layer may be generated in various manners, the building layer of an example embodiment may be generated, such as by the map generation system and, more particularly, by the processing circuitry, by identifying the pixels of the raster image having pixel values within a second predefined range, such as a predefined range of pixel values representative of the color(s) associated with buildings. The representations of one or more buildings within a building layer may be refined by grouping pixels having comparable pixel values into shapes representative of the corresponding shapes of one or more buildings. However, the building layer including the representations of one or more buildings may be generated in a wide variety of other manners, such as by being created manually or automatically using a geographic information system (GIS) and its software, being purchased from a vendor, etc. Also, although described herein and depicted in FIG. 3 to be performed after having processed the pixel values that have been extracted from the raster image so as to retain pixel values within a predefined range while eliminating other pixel values, the building layer may be accessed prior to processing the pixel values extracted from the raster image in other example embodiments.

In accordance with an example embodiment, the map generation system 20 of an example embodiment includes means, such as the processing circuitry 22 or the like, for modifying the representation of the shadow in order to more accurately represent the shadow cast by one or more buildings. See block 36 of FIG. 3. In this regard, the map generation system, such as the processing circuitry, is configured to modify the pixel values of respective pixels based upon a shape of the one or more buildings as defined by the building layer. Thus, the representation of the shadow, as modified, has a shape corresponding to the shape of the one or more buildings. In an example embodiment, the representation of the shadow, as modified, has a shape that is identical to the shape of the one or more buildings.

The representation of a shadow may be modified by modifying the pixel values of respective pixels based upon the shape of the one or more buildings in various manners. In an example embodiment depicted in FIG. 4, however, the map generation system 20 includes means, such as the processing circuitry 22 or the like, for modifying the representation of the shadow by translating a representation of the one or more buildings toward an edge of the representation of the shadow. By way of example and as shown in FIG. 5, the outline of a building defined by a building layer is depicted as a 2D footprint 50. The representation of the shadow that has been derived from a raster image by processing the pixel values so as to retain pixels having pixel values within a predefined range while eliminating pixels having other pixel values is also shown in FIG. 5 by the curve 52. The location of the building may be defined by the building layer and the location of the representation of the shadow may be similarly defined by the relative locations of the pixels of the raster image such that representation of the shadow is located proximate the representation of the corresponding building.

While the shadow provides a general approximation of the shape of the building, the shadow may have a shape or outline that varies significantly from the corresponding shape or outline of the building. These variations may be due to a variety of factors including shadows cast by other objects proximate the building, such as trees, shrubs, vehicles or the like. Additionally, the representation the shadow may deviate from the representation of the corresponding building due to other factors, such as noise present in the capture of the raster imagery since the raster imagery is of lower resolution than LIDAR or other types of high resolution imagery. Additionally, the representation of the shadows may include speckle that further diminishes the quality of the resulting map.

Figure 4:
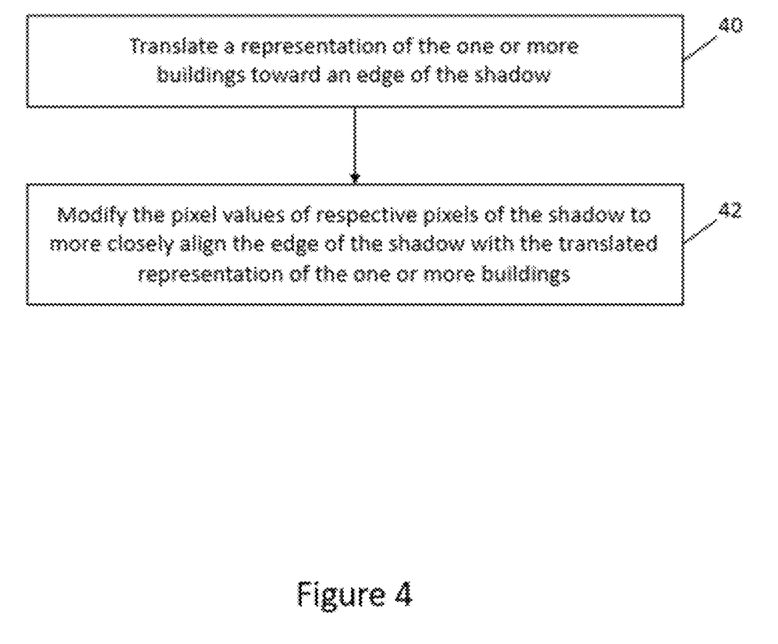
FIG. 4 is a flow chart illustrating operations performed, such as by the map generation system of FIG. 2, in order to modify the shadow in accordance with an example embodiment of the present disclosure.
Figure 5:
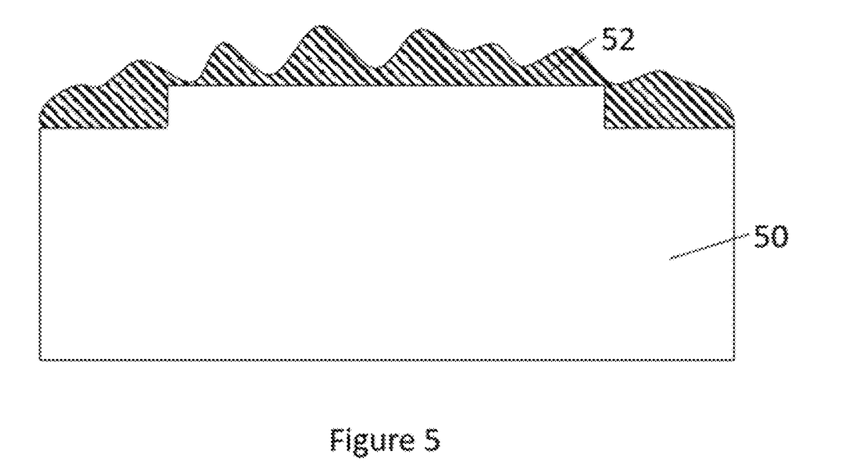
FIG. 5 depicts a two-dimensional footprint of a building and a shadow associated with the respective building as extracted from a raster image.
Figure 6:
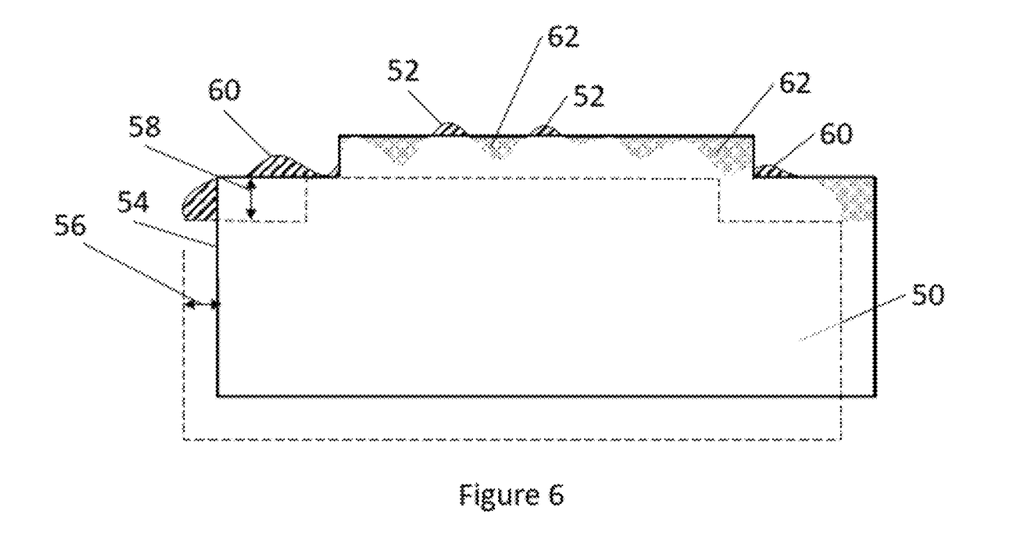
FIG. 6 illustrates the two-dimensional footprint of a respective building as shown in FIG. 5 following translation of a representation of the building toward an edge of the shadow as well as the modification of the shadow to more closely align the edge of the shadow with the translated representation of the respective building in accordance with an example embodiment of the present disclosure.

As indicated above with respect to block 40 of FIG. 4 and for which an example is depicted in FIG. 6, the representation of the building, such as the 2D footprint of the building, is translated toward an edge of the representation of the shadow associated with the building. As shown in FIG. 6, the representation of the building is translated from an original position 50 as shown in dashed lines to a translated position 54 as shown in solid lines. In this example embodiment, the representation of the building is translated in two dimensions, such as the x direction 56 and the y direction 58, such that the translated representation of the building, e.g., the translation of the outline of the building, is located proximate the edge of the representation of the shadow 52 corresponding to the building. Alternatively, the representation of the building may be translated in only a single direction.

The direction in which the building is translated may be defined in various manners. For example, the direction in which the representation of the building is translated may be predefined, such as based upon the position and angle of the sun relative to the buildings at the time at which the raster image was captured with the resulting direction in which the representation of the building is translated being representative of the direction in which shadows were cast by the buildings at the time at which the raster image was captured. Alternatively, the map generation system 20, such as the processing circuitry 22, may be configured to determine the direction in which the representation of the building is to be translated based upon the relative location of the representation of the shadow with respect to the representation of the building with the direction in which the representation of the building is translated being a direction that brings the translated representation of the building into the closest alignment with the representation of the shadow that is possible. For increased accuracy, the raster image from which the representation of the shadows is determined may be from the same date and, in some embodiments, the same date and time, as the date associated with the building layer. Also, features of the raster image may be aligned with the existing building layer, such as in patches of a predetermined size, such as a size of 5-10 square kilometers.

The distance that the representation of the building is translated may also be defined in various manners. In an example embodiment, the map generation system 20, such as the processing circuitry 22, is configured to translate the representation of the building toward an edge of the representation of the shadow such that the outline of the translated representation of the building most closely aligns with the edge of the representation of the shadow. In this example embodiment, not only is the direction of translation, but also the distance by which the representation of the building is translated defined by the representation of the shadow with the direction and distance in which the representation of the building is translated being defined in order to most closely align the outline of the translated representation of the building with the edge of the representation of the shadow.

In an alternative embodiment, the map generation system 20, such as the processing circuitry 22, is configured to translate the representation of the building by a distance that is based upon the height of the building. The height of the building may be predefined and may be provided to the map generation system, such as in association with the raster imagery. In embodiments in which different sections of a building have different heights, such as a first section with a first height and a second section with a second, different height, the height of the building for purposes of the translation of the representation of the building may, in an example embodiment, be the mean average height of the building. In this example embodiment, in addition to the height of the building, such as the mean average height of the building, the distance by which the representation of the building will be translated based upon the height of the building may also be predefined. For example, the distance by which the representation of the building may be translated may be defined as a predefined multiple of the height of the building, such as 0.2 times the height, 0.1 times height or the like. For example, the predefined multiple may be based upon the angle and location of the sun relative to the building at the time at which the raster image was captured with information regarding the angle and location of the sun relative to the building at the time at which the raster image was captured may be provided in association with the raster image. Based upon the angle and location of the sun relative to the building at the time the raster image was captured and the height of the building, the length of the shadow cast by the building (and the direction of the shadow relative to the building) may be defined geometrically to be representative of the actual shadow cast by the building at the time of image capture.

As shown in block 42 of FIG. 4, the map generation system 20 of this example embodiment not only translates the representation of the building toward the edge of the shadow, but also include the means, such as the process circuitry or the like, for modifying the pixel values of respective pixels of the representation of the shadow to more closely align the edge of the shadow with the translated representation of the building, e.g., with the outline of the translated representation of the building. For example, the pixel values of respective pixels of the representation of the shadow may be modified to fully align the edge of the representation of the shadow with the outline of the translated representation of the building. As shown in FIG. 6, for example, following translation of the representation of the building toward the edge of the representation of the shadow, the edge of the representation of the shadow 52 is not aligned with the translated representation 54 of the building. Instead, some portions of the representation of a shadow, such as those portions 60 shown in crosshatching in FIG. 6, lie outside the translated representation of the building. Conversely, some portions of the translated representation of the building, such as those portions 62 that are speckled in FIG. 6, lie within the representation of the shadow.

In order to more closely align the edge of the representation 52 of the shadow with the outline of the translated representation 54 of the building, those portions of the representation of the shadow that lie outside the translated representation of the building, such as those portions 60 that are crosshatched in FIG. 6, are modified, such as by modifying the pixel values of the respective pixels to no longer have a pixel value representative of a shadow, such as to no longer have a pixel value within the predefined range representative of a shadow. For example, in an embodiment in which a pixel value representative of a black color is representative of a shadow, the pixel values of the pixels of the representation of the shadow that lie outside the translated representation of the building may be modified so as to longer be representative of a black color, but to, instead, be representative of a white or other lighter color so as to no longer be considered a portion of the modified representation of the shadow. Similarly, those portions of the representation of the shadow that lie within the translated representation of the building, such as those portions 62 that are speckled in FIG. 6, are modified, such as by modifying the pixel values of the respective pixels to have a pixel value representative of a shadow, such as to have a pixel value within the predefined range representative of a shadow. For example, in an embodiment in which a pixel value representative of a black color is representative of a shadow, the pixel values of the pixels of the representation of the shadow that lie within the translated representation of the building may be modified so as to longer be representative of a white or other lighter color, but to, instead, be representative of a black color so as to now be considered a portion of the modified representation of the shadow.

Following the modification of the representation of the shadow, the resulting representation of the modified shadow is more closely aligned with the shape of the corresponding building, such as by being fully aligned in shape with the outline of the representation of the corresponding building, albeit offset from the representation of the corresponding building by a distance and in a direction corresponding to the distance and direction by which a shadow is cast by the building, such as at the time at which the raster image of the building was captured. See, for example, FIG. 7 which depicts the original representation 50 of the building as a well as the representation 64 of the modified shadow that has a shape that more closely corresponds to the shape of the representation of the building.

Figure 7:
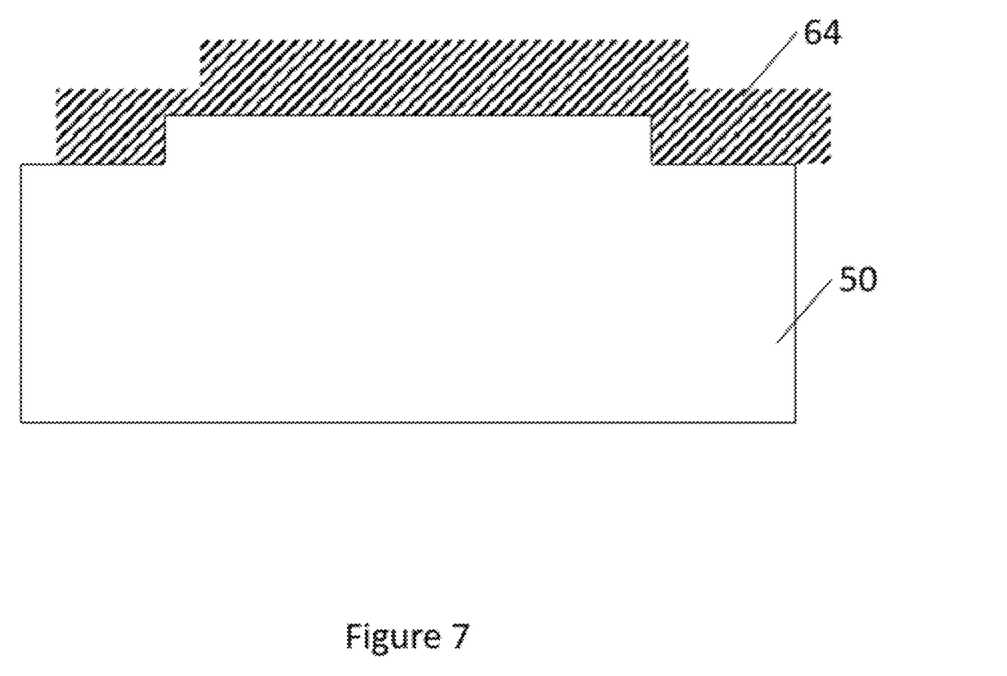
FIG. 7 depicts a two-dimensional footprint of the respective building of FIGS. 5 and 6 and the associated shadow following modification of the shadow in accordance with an example embodiment of the present disclosure.

By modifying the representation of the shadow, such as in the manner described above, one or more portions of representation of the shadow that represented one or more objects other than the corresponding building have been eliminated, thereby reducing the noise and speckle associated with the original representation of the shadow derived from the raster image. In this regard, shadows cast by bushes, trees, vehicles or the like in the proximity of the building that serve to create a composite shadow in combination with the shadow cast by the building have a shape that varies from the shape of the corresponding building and have been eliminated such that the resulting modified representation of the shadow more closely aligns with the shape of the corresponding building. The resulting modified representation of the shadow has less noise and speckle and serves as a more accurate representation of the building.

As shown in block 38 of FIG. 3, the map generation system 20 of an example embodiment also includes means, such as the processing circuitry 22, the memory device 24, the user interface 26 or the like, for causing presentation and/or storage of the building layer representing the one or more buildings and a shadow layer representing the shadow cast by the one or more buildings and having a shape corresponding to the shape of the one or more buildings. In this regard, the shadow layer defines the modified representations of the shadows, at least in terms of size, shape and location. Thus, the resulting map created by the map generation system, method and computer program product of an example embodiment provides for the depiction of shadows that more accurately represent the shadows cast by buildings without the noise and clutter associated with shadows cast by other objects of less interest to a user. Thus, the resulting map will appear less cluttered and more accurate to a user and correspondingly enhance the user experience. However, by relying upon raster imagery in order to generate the representation of the shadows, the map generation system, method and computer program product of an example embodiment may generate more accurate representations of the shadows in a computationally efficient manner by avoiding the more complex and processing intensive computations required in instances in which higher resolution imagery is utilized.

As described above, FIGS. 3 and 4 illustrate flowcharts of a map generation system 20, method, and computer program product according to example embodiments of the invention. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the map generation system and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A map generation system comprising processing circuitry and at least one memory including computer program code, the at least one memory and computer program code configured to, with the processing circuitry, cause the map generation system to at least:
   extract pixel values from a raster image of one or more buildings;
   process the pixel values so as to retain pixel values determined to be representative of a shadow while eliminating other pixel values;
   modify a representation of the shadow by modifying the pixel values of respective pixels based upon a shape of the one or more buildings such that the representation of the shadow, as modified, has a shape corresponding to the shape of the one or more buildings; and
   generate a map based upon the shape of the one or more buildings and the representation of the shadow, as modified, to have the shape corresponding to the shape of the one or more buildings.

2. A map generation system according to claim 1 wherein the at least one memory and the computer program code are configured to, with the processing circuitry, cause the map generation system to modify the representation of the shadow by:
   translating a representation of the one or more buildings toward an edge of the representation of the shadow; and
   modifying the pixel values of respective pixels of the shadow to more closely align the edge of the representation of the shadow with the translated representation of the one or more buildings.

3. A map generation system according to claim 2 wherein the at least one memory and the computer program code are configured to, with the processing circuitry, cause the map generation system to translate the representation of the one or more buildings by translating the representation of the one or more buildings based upon a height of the one or more buildings.

4. A map generation system according to claim 3 wherein the at least one memory and the computer program code are further configured to, with the processing circuitry, cause the map generation system to translate the representation of the one or more buildings by translating the representation of a respective building based upon an average height of the respective building.

5. A map generation system according to claim 1 wherein the at least one memory and the computer program code are configured to, with the processing circuitry, cause the map generation system to modify the representation of the shadow by eliminating one or more portions of the representation of the shadow that represent one or more objects other than the one or more buildings.

6. A map generation system according to claim 1 wherein the at least one memory and the computer program code are configured to, with the processing circuitry, cause the map generation system to modify the representation of the shadow by modifying the pixel values of respective pixels based upon a shape of the one or more buildings such that the representation of the shadow, as modified, has an identical shape to the shape of the one or more buildings.

7. A map generation system according to claim 1 wherein the at least one memory and the computer program code are further configured to, with the processing circuitry, cause the map generation system to modify the representation of the shadow based upon a two dimensional footprint representing the shape of each of the one or more buildings.

8. A method comprising:
   extracting pixel values from a raster image of one or more buildings;
   processing the pixel values so as to retain pixel values determined to be representative of a shadow while eliminating other pixel values;
   modifying a representation of the shadow by modifying the pixel values of respective pixels based upon a shape of the one or more buildings such that the representation of the shadow, as modified, has a shape corresponding to the shape of the one or more buildings; and
   generating a map based upon the shape of the one or more buildings and the representation of the shadow, as modified, to have the shape corresponding to the shape of the one or more buildings.

9. A method according to claim 8 wherein modifying the representation of the shadow comprises:
   translating a representation of the one or more buildings toward an edge of the representation of the shadow; and
   modifying the pixel values of respective pixels of the representation of the shadow to more closely align the edge of the representation of the shadow with the translated representation of the one or more buildings.

10. A method according to claim 9 wherein translating the representation of the one or more buildings comprises translating the representation of the one or more buildings based upon a height of the one or more buildings.

11. A method according to claim 10 wherein translating the representation of the one or more buildings further comprises translating the representation of a respective building based upon an average height of the respective building.

12. A method according to claim 8 wherein modifying the representation of the shadow comprises eliminating one or more portions of the representation of the shadow that represent one or more objects other than the one or more buildings.

13. A method according to claim 8 wherein modifying the representation of the shadow comprises modifying the pixel values of respective pixels based upon a shape of the one or more buildings such that the representation of the shadow, as modified, has an identical shape to the shape of the one or more buildings.

14. A method according to claim 8 wherein modifying the representation of the shadow comprises modifying the representation of the shadow based upon a two dimensional footprint representing the shape of each of the one or more buildings.

15. A computer program product comprising at least one non-transitory computer-readable storage medium having computer-executable program code portions stored therein, the computer-executable program code portions comprising program code instructions configured to:
   extract pixel values from a raster image of one or more buildings;
   process the pixel values so as to retain pixel values determined to be representative of a shadow;
   modify a representation of the shadow by modifying the pixel values of respective pixels based upon a shape of the one or more buildings such that the representation of the shadow, as modified, has a shape corresponding to the shape of the one or more buildings; and
   generate a map based upon the shape of the one or more buildings and the representation of the shadow, as modified, to have the shape corresponding to the shape of the one or more buildings.

16. A computer program product according to claim 15 wherein the program code instructions configured to modify the representation of the shadow comprise program code instructions configured to:
   translate a representation of the one or more buildings toward an edge of the representation of the shadow; and
   modify the pixel values of respective pixels of the shadow to more closely align the edge of the representation of the shadow with the translated representation of the one or more buildings.

17. A computer program product according to claim 16 wherein the program code instructions configured to translate the representation of the one or more buildings comprise program code instructions configured to translate the representation of the one or more buildings based upon a height of the one or more buildings.

18. A computer program product according to claim 17 wherein the program code instructions configured to translate the representation of the one or more buildings further comprise program code instructions configured to translate the representation of a respective building based upon an average height of the respective building.

19. A computer program product according to claim 15 wherein the program code instructions configured to modify the shadow comprise program code instructions configured to eliminate one or more portions of the representation of the shadow that represent one or more objects other than the one or more buildings.

20. A computer program product according to claim 15 wherein the program code instructions configured to modify the representation of the shadow comprise program code instructions configured to modify the pixel values of respective pixels based upon a shape of the one or more buildings such that the representation of the shadow, as modified, has an identical shape to the shape of the one or more buildings.

* * * * *